(12) United States Patent
Hagiwara et al.

(10) Patent No.: US 6,631,742 B1
(45) Date of Patent: Oct. 14, 2003

(54) HYDRAULIC PRESSURE HOSE

(75) Inventors: Hideki Hagiwara, Hitachi (JP); Yoji Kobayashi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 08/699,331

(22) Filed: Aug. 19, 1996

(30) Foreign Application Priority Data

Aug. 28, 1995 (JP) ............................................. 7-218412

(51) Int. Cl.$^7$ ............................ F16L 11/08; F16L 11/04
(52) U.S. Cl. ...................... 138/126; 138/124; 138/137; 138/140
(58) Field of Search ................................ 138/126, 123, 138/124, 125, 127, 137, 141, 140

(56) References Cited

U.S. PATENT DOCUMENTS 4,998,565 A * 3/1991 Kokuryu et al. ............ 138/126
5,660,210 A * 8/1997 Ikeda et al. .................. 138/126

FOREIGN PATENT DOCUMENTS

GB 1253178 11/1971
GB 1531732 11/1978

* cited by examiner

*Primary Examiner*—Patrick Brinson
(74) *Attorney, Agent, or Firm*—Antonelli, Terry, Stout & Kraus, LLP

(57) ABSTRACT

An amount of expansion of a hydraulic pressure hose is decreased and the fatigue characteristic against repeating pressurization, bending and twisting is improved. The hydraulic pressure hose comprising an inner rubber layer, a first braided fiber reinforced layer formed in the outer periphery of the inner rubber layer, an intermediate rubber layer formed in the outer periphery of the first braided fiber reinforced layer, a second braided fiber reinforced layer formed in the outer periphery of the intermediate rubber layer and an outer rubber layer formed in the outer periphery of the second braided fiber reinforced layer, wherein the first braided fiber reinforced layer is formed of fibers having 950 deniers to 1050 deniers, the thickness of the first braided fiber reinforced layer being 0.30 mm to 0.50 mm.

6 Claims, 2 Drawing Sheets

HYDRAULIC PRESSURE HOSE

BACKGROUND OF THE INVENTION

1. Field of the Invention

The present invention relates to a hydraulic pressure hose, and more particularly relates to a hydraulic brake hose for a vehicle.

2. Description of Related Art

In general, a hydraulic brake hose for a vehicle is constructed an inner rubber layer, a first braided fiber reinforced layer formed in the outer periphery of the inner rubber layer, an intermediate rubber layer formed in the outer periphery of the first braided fiber reinforced layer, a second braided fiber reinforced layer formed in the outer periphery of the intermediate rubber layer and an outer rubber layer formed in the outer periphery of the second braided fiber reinforced layer.

Vinylon fiber used for the hydraulic brake hose for a vehicle generally has 1200 deniers. As for a braiding machine for forming such a reinforced layer using such fiber, a braiding machine of 24 carrier type is commonly used. A braiding machine of 20 carrier type is sometime used.

A conventional first braided fiber reinforced layer employs braided fiber of 1200 deniers, 2-fiber yarn, 20 to 24 beatings.

The conventional brake hose described above has a disadvantage in that the braided fiber is easily lessened because of too much fiber. When the hose suffers repeating pressurizing, bending and twisting, the fatigue characteristic of the hose is often degraded by friction between the braided fibers. In addition to this, it is difficult to attain a static angle indicating the minimum value of expansion and contraction. Further, the diameter of the first braided fiber reinforced layer dominating the amount of hose expansion becomes large. Even when a high elastic fiber, for example, vinylon fiber is used for the braided fiber reinforced layer, the amount of hose expansion becomes large in the pressure range of actual use (0 to 50 kgf/cm$^2$). As the result, there is a disadvantage in that these affect a bad influence on feeling of braking.

In a conventional technology disclosed in Japanese Patent Application Laid-Open No.5-248571, lower expansion and improved fatigue characteristic are attained by adjusting tensile strength of fiber. However, it is required to develop a hydraulic pressure hose using another method which can decrease the expansion rate and at the same time can improve the fatigue characteristic.

SUMMARY OF THE INVENTION

The present invention is developed to solve the above problems. An object of the present invention is to decrease the amount of expansion of a hydraulic pressure hose under pressure of 0 to 30 kgf/cm$^2$ and to improve the fatigue characteristic against repeating pressurization, bending and twisting.

The present invention can substantially decrease the amount of expansion of a hydraulic pressure hose and improve the fatigue characteristic by properly selecting the diameter of fibers composing the hose and the outer diameter of each layer constructing the hose.

That is, the hydraulic pressure hose comprising an inner rubber layer, a first braided fiber reinforced layer formed in the outer periphery of the inner rubber layer, an intermediate rubber layer formed in the outer periphery of the first braided fiber reinforced layer, a second braided fiber reinforced layer formed in the outer periphery of the intermediate rubber layer and an outer rubber layer formed in the outer periphery of the second braided fiber reinforced layer, wherein the first braided fiber reinforced layer is formed of fibers having 950 deniers to 1050 deniers, the thickness of the first braided fiber reinforced layer being 0.30 mm to 0.50 mm.

DETAILED DESCRIPTION OF THE PREFERRED EMBODIMENTS

The present invention will be described in detail below, referring to the accompanying drawings.

Figure 1:
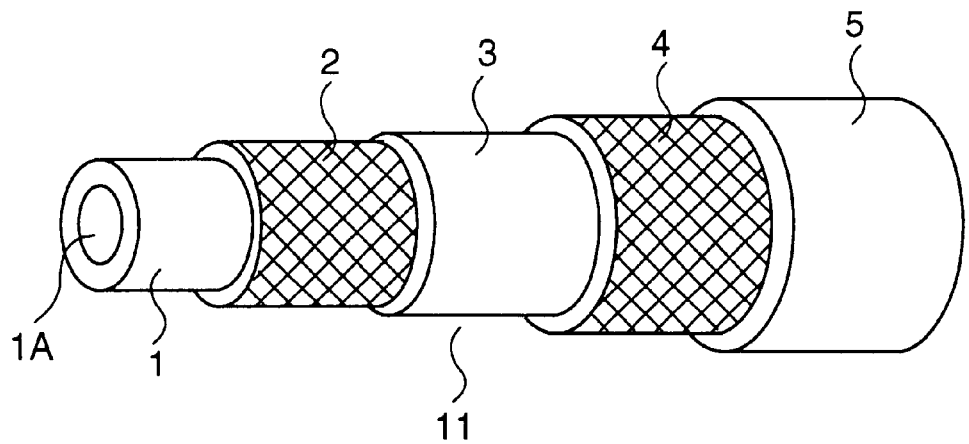
FIG. 1 is a view explaining each of layers constructing a hydraulic pressure hose for a vehicle in accordance with the present invention.

As shown in FIG. 1, the hydraulic pressure hose 11 for a vehicle comprises an inner rubber layer 1, a first braided fiber reinforced layer 2 formed in the outer periphery of the inner rubber layer 1, an intermediate rubber layer 3 formed in the outer periphery of the first braided fiber reinforced layer 2, a second braided fiber reinforced layer 4 formed in the outer periphery of the intermediate rubber layer 3 and an outer rubber layer 5 formed in the outer periphery of the second braided fiber reinforced layer 4.

The inner rubber layer 1 is made of EPDM and a hose hole 1A is formed in the center so that the inner diameter becomes 3.3 mm.

The first braided fiber reinforced layer 2 is so formed that the outer diameter becomes 6 mm using vinylon fibers having 1000 deniers and number of twists of 45 turns/m. The vinylon fiber used has a rubber adhesion treating layer of 5 weight % to the weight of the vinylon fiber.

The intermediate rubber layer 3 is made of a blend of EPDM and IIR.

The second braided fiber reinforced layer 4 is so formed that the outer diameter becomes 8.0 mm using vinylon fiber.

The outer rubber layer 5 is made of a blend of CR and EPDM, and so formed that the outer diameter becomes 10.2 mm.

A series of steering-wheel turning tests at a high temperature were performed using the hydraulic pressure brake hose for a vehicle having the aforementioned construction in accordance with the present invention and a conventional hydraulic pressure hose for comparison.

Figure 2:
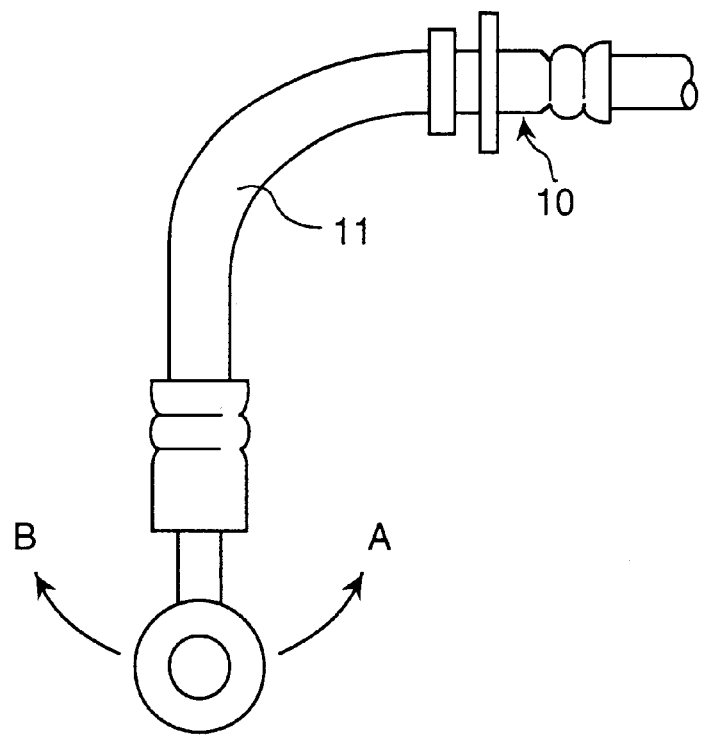
FIG. 2 is a view explaining the state of a high temperature steering-wheel turning test.
Figure 3:
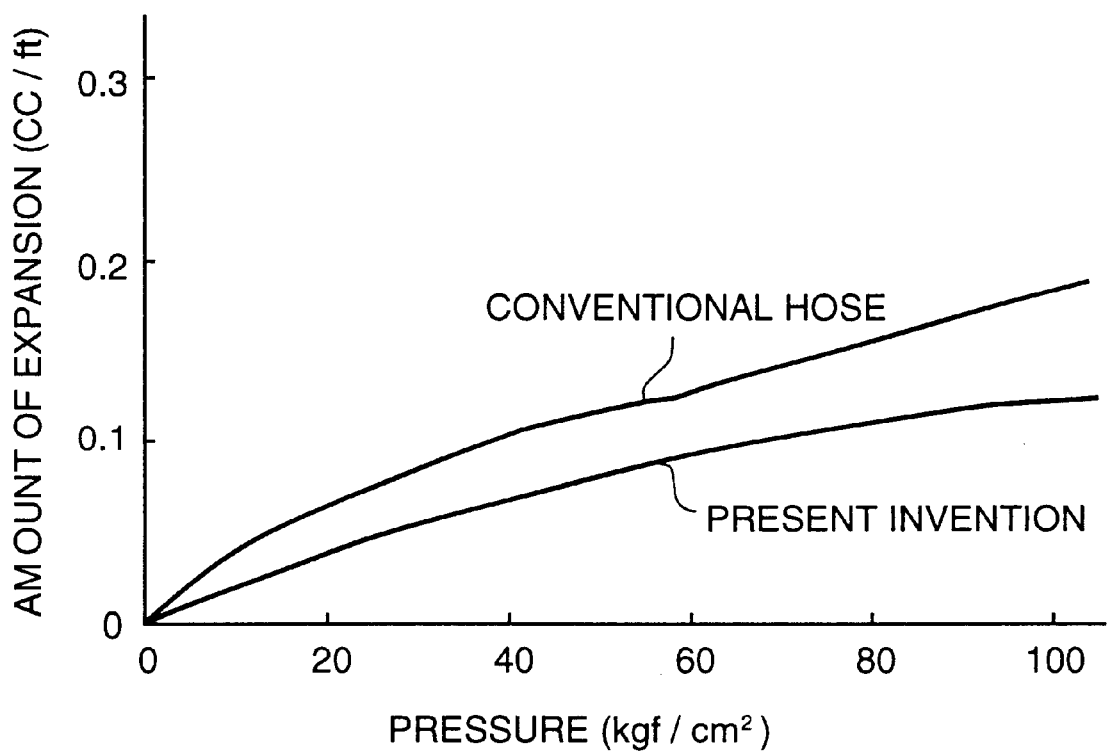
FIG. 3 is a graph showing the amount of expansion by pressurization for a hose in accordance with the present invention and a conventional hose.

FIG. 2 shows the state of a high temperature steering-wheel turning test. A position 10 in the figure was fixed and the hose 11 of a test sample is repeated to be turned in the directions of the arrows A, B. The tests were performed under the condition of pressure of 100 kgf/cm$^2$ and environmental temperature of 100° C. using three samples for the conventional hoses and three samples for the hoses in accordance with the present invention. The test result is shown in Table 1 and FIG. 3.

TABLE 1

| SAMPLE | | NUMBER OF TURNS UNTIL HOSE RUPTURES |
|---|---|---|
| CONVENTIONAL | SAMPLE 1 | 280 thousands |
| | SAMPLE 2 | 320 thousands |
| | SAMPLE 3 | 370 thousands |
| PRESENT INVENTION | SAMPLE 1 | 700 thousands |
| | SAMPLE 2 | 750 thousands |
| | SAMPLE 3 | 940 thousands |

TEST CONDITION
PRESSURE: 0–100 kgf/cm$^2$
ENVIRONMENTAL TEMPERATURE: 100° C.

It is clear from Table 1 that the fatigue life time to a high temperature steering-wheel turning of the brake hose in accordance with the present invention is approximately 2 to 3 time as long as that of the conventional brake hose.

Further, the amount of expansion of the brake hose in accordance with the present invention is substantially improved, that is, decreased compared to that of the conventional brake hose.

The present invention is not limited to the above embodiment, it is to be understood that the following changes and variations may be made within the philosophy of the present invention. That is, the inner rubber layer 1 may be made of SBR, EPDM, IIR, NBR or a blend of them, and the inner diameter of the hose may be set to a value within the range of 3.1 to 3.5 mm.

The first braided fiber reinforced layer 2 may be made of vinylon fibers having 950 to 1050 deniers, and may be braided so that the thickness becomes 0.30 to 0.50 mm, preferably 0.35 to 0.45 mm using a braiding machine of 24 carrier with 2-fiber yarn. The outer diameter may be set to a value within the range of 5.5 to 6.5 mm, preferably 5.6 to 6.2 mm.

The intermediate rubber layer 3 may be made of NR, EPDM, IIR, CR or a blend of them.

The outer diameter of the second braided fiber reinforced layer 4 may be set to a value within the range of 7.5 to 8.5 mm.

The outer rubber layer 5 may be made of CR, EPDM, CSM or a blend of them, or elastomer materials such as polyolefin, polyamide, polyurethan, vinyl-chloride.

Further, the outer diameter of the hose may be set to a value within the range of 9.5 to 10.5 mm, preferably 9.8 to 10.2 mm.

In the present invention, the first braided fiber reinforced layer is formed of fiber having a diameter within the range of 950 deniers to 1050 deniers, and the thickness of the first braided fiber reinforced layer is formed so as to have a value within the range of 0.30 mm to 0.50 mm. By doing so, there is an effect that the amount of expansion of the hose can be extremely decreased and the fatigue characteristic to repeating pressurization, bending and twisting can be improved.

What is claimed is:

1. A hydraulic pressure hose comprising an inner rubber layer, a first braided fiber reinforced layer formed in the outer periphery of said inner rubber layer, an intermediate rubber layer formed in the outer periphery of said first braided fiber reinforced layer, a second braided fiber reinforced layer formed in the outer periphery of said intermediate rubber layer and an outer rubber layer formed in the outer periphery of said second braided fiber reinforced layer, wherein said first braided fiber reinforced layer is formed of fibers having 950 deniers to 1050 deniers, the thickness of said first braided fiber reinforced layer being 0.30 mm to 0.50 mm.

2. A hydraulic pressure hose according to claim 1, wherein the thickness of said first braided fiber reinforced layer is 0.35 mm to 0.45 mm.

3. A hydraulic pressure hose according to claim 1, wherein the outer diameter of said first braided fiber reinforced layer is 5.5 mm to 6.5 mm.

4. A hydraulic pressure hose according to claim 1, wherein the outer diameter of said hydraulic pressure hose is 9.5 mm to 10.5 mm.

5. A hydraulic pressure hose according to claim 1, wherein said hydraulic pressure hose is a brake hose for a vehicle.

6. A hydraulic pressure hose according to claim 1, wherein said fibers of the first braided fiber reinforced layer are made of vinylon.

* * * * *